United States Patent
Mårtensson

(10) Patent No.: US 7,497,058 B2
(45) Date of Patent: Mar. 3, 2009

(54) FLOORING PANEL OR WALL PANEL AND USE THEREOF

(75) Inventor: Göran Mårtensson, Klagstord (SE)

(73) Assignee: Pergo (Europe) AB, Trelleborg (SE)

( * ) Notice: Subject to any disclaimer, the term of this patent is extended or adjusted under 35 U.S.C. 154(b) by 433 days.

(21) Appl. No.: 10/158,945

(22) Filed: Jun. 3, 2002

(65) Prior Publication Data

US 2002/0152707 A1 Oct. 24, 2002

Related U.S. Application Data

(63) Continuation of application No. 09/637,036, filed on Aug. 10, 2000, now Pat. No. 6,397,547, which is a continuation of application No. 08/894,966, filed as application No. PCT/SE96/00256 on Feb. 29, 1996, now Pat. No. 6,101,778.

(30) Foreign Application Priority Data

Mar. 7, 1995 (SE) .................................. 9500810

(51) Int. Cl.
*E04B 1/38* (2006.01)
(52) U.S. Cl. ............... 52/582.1; 52/586.1; 52/591.1; 52/591.3; 52/591.4; 52/592.1; 52/592.2
(58) Field of Classification Search ............... 52/588.1, 52/586.1, 591.1, 591.3, 591.4, 592.1, 592.2
See application file for complete search history.

(56) References Cited

U.S. PATENT DOCUMENTS

| | | | |
|---|---|---|---|
| 213,740 A | 4/1879 | Conner | |
| 714,987 A | 12/1902 | Wolfe | |
| 753,791 A | 3/1904 | Fulghum | |
| 1,124,228 A | 1/1915 | Houston | |
| 1,407,679 A | 2/1922 | Ruchrauff | |
| 1,454,250 A | 5/1923 | Parsons | |
| 1,468,288 A | 9/1923 | Fen | |
| 1,510,924 A | 10/1924 | Daniels et al. | |
| 1,540,128 A | 6/1925 | Houston | |
| 1,575,821 A | 3/1926 | Daniels | |
| 1,602,256 A | 10/1926 | Sellin | |

(Continued)

FOREIGN PATENT DOCUMENTS

AU  199732569  12/1999

(Continued)

OTHER PUBLICATIONS

Patent Mit Inter-nationalem, Die Revolution ((von Grund auf)) Fibo-Trespo, Disstributed at the Domotex fair in Hannover, Germany in Jan. 1996.

(Continued)

*Primary Examiner*—Jeanette Chapman
(74) *Attorney, Agent, or Firm*—Novak Druce + Quigg L.L.P.

(57) ABSTRACT

Flooring panel or wall panel and a use thereof in a wet room. The panel is provided with a locking means in the form of groove (6) and tongue (7) forming a tongue/groove joint for assembling of the panels. The groove (6) and the tongue (7) are preferably made of water tight material and formed with a snap-together joint.

3 Claims, 3 Drawing Sheets

U.S. PATENT DOCUMENTS

| | | | |
|---|---|---|---|
| 1,602,267 A | 10/1926 | Karwisde | |
| 1,615,096 A | 1/1927 | Myers | |
| 1,622,103 A | 3/1927 | Fulton | |
| 1,622,104 A | 3/1927 | Fulton | |
| 1,637,634 A | 8/1927 | Carter | |
| 1,644,710 A | 10/1927 | Crooks | |
| 1,660,480 A | 2/1928 | Daniels | |
| 1,714,738 A | 5/1929 | Smith | |
| 1,718,702 A | 6/1929 | Pfiester | |
| 1,734,826 A | 11/1929 | Pick | |
| 1,764,331 A | 6/1930 | Moratz | |
| 1,778,069 A | 10/1930 | Fetz | |
| 1,787,027 A | 12/1930 | Wasleff | |
| 1,823,039 A | 9/1931 | Gruner | |
| 1,859,667 A | 5/1932 | Gruner | |
| 1,898,364 A | 2/1933 | Gynn | |
| 1,906,411 A | 4/1933 | Potvin | |
| 1,929,871 A | 10/1933 | Jones | |
| 1,940,377 A | 12/1933 | Storm | |
| 1,953,306 A | 4/1934 | Moratz | |
| 1,986,739 A | 1/1935 | Mitte | |
| 1,988,201 A | 1/1935 | Hall | |
| 2,004,193 A | 6/1935 | Cherry | |
| 2,044,216 A | 6/1936 | Klages | |
| 2,276,071 A | 3/1942 | Scull | |
| 2,324,628 A | 7/1943 | Kahr | |
| 2,398,632 A | 4/1946 | Frost et al. | |
| 2,430,200 A | 11/1947 | Wilson | |
| 2,740,167 A | 4/1956 | Rowley | |
| 2,780,253 A | 2/1957 | Joa | |
| 2,894,292 A | 7/1959 | Gramelspacher | |
| 3,045,294 A | 7/1962 | Livezey, Jr. | |
| 3,100,556 A | 8/1963 | Ridder | |
| 3,125,138 A | 3/1964 | Bolenbach | |
| 3,182,769 A | 5/1965 | de Ridder | |
| 3,203,149 A | 8/1965 | Soddy | |
| 3,267,630 A | 8/1966 | Omholt | |
| 3,282,010 A | 11/1966 | King, Jr. | |
| 3,310,919 A | 3/1967 | Bue et al. | |
| 3,347,048 A | 10/1967 | Brown et al. | |
| 3,387,422 A | 6/1968 | Wanzer | |
| 3,460,304 A | 8/1969 | Braeuninger et al. | |
| 3,479,784 A | 11/1969 | Massagli | |
| 3,481,810 A | 12/1969 | Waite | |
| 3,526,420 A | 9/1970 | Brancaleone | |
| 3,535,844 A | 10/1970 | Glaros | |
| 3,538,665 A | 11/1970 | Gohner | |
| 3,553,919 A | 1/1971 | Omholt | |
| 3,555,762 A | 1/1971 | Costanzo, Jr. | |
| 3,694,983 A | 10/1972 | Couquet | |
| 3,714,747 A | 2/1973 | Curran | |
| 3,720,027 A | 3/1973 | Christensen | |
| 3,731,445 A | 5/1973 | Hoffmann et al. | |
| 3,759,007 A | 9/1973 | Thiele | |
| 3,768,846 A | 10/1973 | Hensley et al. | |
| 3,798,111 A | 3/1974 | Lane et al. | |
| 3,807,113 A | 4/1974 | Turner | |
| 3,859,000 A | 1/1975 | Webster | |
| 3,902,293 A | 9/1975 | Witt et al. | |
| 3,908,053 A | 9/1975 | Hettich | |
| 3,921,312 A | 11/1975 | Fuller | |
| 3,936,551 A | 2/1976 | Elmendorf et al. | |
| 3,988,187 A | 10/1976 | Witt et al. | |
| 4,090,338 A | 5/1978 | Bourgade | |
| 4,099,358 A | 7/1978 | Compaan | |
| 4,169,688 A | 10/1979 | Toshio | |
| 4,242,390 A | 12/1980 | Nemeth | |
| 4,299,070 A | 11/1981 | Oltmanns et al. | |
| 4,390,580 A * | 6/1983 | Donovan et al. | 428/68 |
| 4,426,820 A | 1/1984 | Terbrack et al. | |
| 4,449,346 A | 5/1984 | Tremblay | |
| 4,471,012 A | 9/1984 | Maxwell | |
| 4,501,102 A | 2/1985 | Knowles | |
| 4,561,233 A | 12/1985 | Harter et al. | |
| 4,612,745 A | 9/1986 | Hovde | |
| 4,641,469 A | 2/1987 | Wood | |
| 4,643,237 A | 2/1987 | Rosa | |
| 4,653,242 A | 3/1987 | Ezard | |
| 4,703,597 A | 11/1987 | Eggemar | |
| 4,715,162 A | 12/1987 | Brightwell | |
| 4,738,071 A | 4/1988 | Ezard | |
| 4,769,963 A | 9/1988 | Meyerson | |
| 4,796,402 A * | 1/1989 | Pajala | 52/390 |
| 4,819,932 A | 4/1989 | Trotter, Jr. | |
| 4,831,806 A | 5/1989 | Niese et al. | |
| 4,845,907 A | 7/1989 | Meek | |
| 4,905,442 A | 3/1990 | Daniels | |
| 4,940,503 A | 7/1990 | Lindgren et al. | |
| 5,029,425 A | 7/1991 | Bogataj | |
| 5,113,632 A | 5/1992 | Hanson | |
| 5,117,603 A | 6/1992 | Weintraub | |
| 5,148,850 A | 9/1992 | Urbanick | |
| 5,165,816 A | 11/1992 | Parasin | |
| 5,179,812 A | 1/1993 | Hill | |
| 5,216,861 A | 6/1993 | Meyerson | |
| 5,253,464 A | 10/1993 | Nilsen | |
| 5,271,564 A | 12/1993 | Smith | |
| 5,295,341 A | 3/1994 | Kajiwara | |
| 5,325,649 A | 7/1994 | Kajiwara | |
| 5,344,700 A | 9/1994 | McGath et al. | |
| 5,348,778 A | 9/1994 | Knipp et al. | |
| 5,349,796 A | 9/1994 | Meyerson | |
| 5,390,457 A | 2/1995 | Sjolander | |
| 5,433,806 A | 7/1995 | Pasquali et al. | |
| 5,474,831 A | 12/1995 | Nystrom | |
| 5,497,589 A | 3/1996 | Porter | |
| 5,502,939 A | 4/1996 | Zadok et al. | |
| 5,540,025 A | 7/1996 | Takehara et al. | |
| 5,567,497 A | 10/1996 | Zegler et al. | |
| 5,570,554 A | 11/1996 | Searer | |
| 5,597,024 A | 1/1997 | Bolyard et al. | |
| 5,618,602 A * | 4/1997 | Nelson | 428/60 |
| 5,618,612 A | 4/1997 | Gstrein | |
| 5,630,304 A | 5/1997 | Austin | |
| 5,671,575 A | 9/1997 | Wu | |
| 5,706,621 A | 1/1998 | Pervan | |
| 5,719,239 A * | 2/1998 | Mirous et al. | 525/427 |
| 5,736,227 A * | 4/1998 | Sweet et al. | 428/192 |
| 5,797,237 A | 8/1998 | Finkell, Jr. | |
| 5,823,240 A | 10/1998 | Bolyard et al. | |
| 5,827,592 A | 10/1998 | Van Gulik et al. | |
| 5,860,267 A | 1/1999 | Pervan | |
| 5,907,934 A | 6/1999 | Austin | |
| 5,935,668 A | 8/1999 | Smith | |
| 5,941,047 A | 8/1999 | Johansson | |
| 5,943,239 A | 8/1999 | Shamblin et al. | |
| 5,968,625 A | 10/1999 | Hudson | |
| 5,987,839 A | 11/1999 | Hamar et al. | |
| 6,006,486 A | 12/1999 | Moriau et al. | |
| 6,021,615 A | 2/2000 | Brown | |
| 6,023,907 A | 2/2000 | Pervan | |
| 6,029,416 A | 2/2000 | Andersson | |
| 6,094,882 A | 8/2000 | Pervan | |
| 6,101,778 A | 8/2000 | Martensson | |
| 6,119,423 A | 9/2000 | Costantino | |
| 6,134,854 A | 10/2000 | Stanchfield | |
| 6,148,884 A | 11/2000 | Bolyard et al. | |
| 6,182,410 B1 | 2/2001 | Pervan | |
| 6,182,413 B1 * | 2/2001 | Magnusson | 52/589.1 |
| 6,205,639 B1 | 3/2001 | Pervan | |
| 6,209,278 B1 | 4/2001 | Tychsen | |
| 6,216,403 B1 | 4/2001 | Belbeoc'h | |
| 6,216,409 B1 | 4/2001 | Roy et al. | |
| 6,314,701 B1 | 11/2001 | Meyerson | |

| | | | | | |
|---|---|---|---|---|---|
| 6,324,803 B1 | 12/2001 | Pervan | DE | 1534802 | 3/2008 |
| 6,324,809 B1 | 12/2001 | Nelson | EP | 0248127 | 12/1987 |
| 6,332,733 B1 * | 12/2001 | Hamberger et al. ......... 403/329 | EP | 0623724 | 11/1994 |
| 6,345,481 B1 * | 2/2002 | Nelson ...................... 52/592.2 | EP | 0652340 | 5/1995 |
| 6,365,258 B1 | 4/2002 | Alm | EP | 0698162 | 2/1996 |
| 6,385,936 B1 | 5/2002 | Schneider | EP | 0843763 | 5/1998 |
| 6,397,547 B1 | 6/2002 | Martensson | EP | 0849416 | 6/1998 |
| 6,418,683 B1 | 7/2002 | Martensson et al. | EP | 0903451 | 3/1999 |
| 6,421,970 B1 | 7/2002 | Martensson et al. | EP | 0855482 | 12/1999 |
| 6,438,919 B1 * | 8/2002 | Knauseder ................. 52/586.2 | EP | 0877130 | 1/2000 |
| 6,446,405 B1 | 9/2002 | Pervan | EP | 0958441 | 1/2000 |
| 6,510,665 B2 | 1/2003 | Pervan | EP | 0969163 A2 | 1/2000 |
| 6,516,579 B1 | 2/2003 | Pervan | EP | 0969164 A2 | 1/2000 |
| 6,532,709 B2 | 3/2003 | Pervan | EP | 0974713 | 1/2000 |
| 6,588,166 B2 | 7/2003 | Martensson et al. | EP | 0969163 A3 | 2/2000 |
| 2001/0029720 A1 | 10/2001 | Pervan | EP | 0969164 A3 | 2/2000 |
| 2002/0007608 A1 | 1/2002 | Pervan | FI | 843060 | 8/1984 |
| 2002/0046538 A1 | 4/2002 | Pervan et al. | FR | 1293043 | 3/1961 |
| 2002/0100242 A1 * | 8/2002 | Olofsson ................... 52/588.1 | FR | 2568295 | 1/1986 |
| 2002/0112433 A1 | 8/2002 | Pervan | FR | 2630149 | 10/1989 |
| 2002/0178573 A1 | 12/2002 | Pervan | FR | 2637932 | 4/1990 |
| 2002/0178674 A1 | 12/2002 | Pervan | FR | 2675174 | 10/1992 |
| 2002/0178682 A1 | 12/2002 | Pervan | FR | 2691491 | 11/1993 |
| 2003/0009972 A1 | 1/2003 | Pervan et al. | FR | 2697275 | 4/1994 |
| 2003/0024199 A1 | 2/2003 | Pervan et al. | FR | 2712329 | 5/1995 |
| 2003/0033784 A1 | 2/2003 | Pervan | FR | 2781513 | 1/2000 |
| 2003/0084636 A1 | 5/2003 | Pervan | FR | 2785633 | 5/2000 |
| | | | GB | 424057 | 2/1935 |
| | FOREIGN PATENT DOCUMENTS | | GB | 585205 | 1/1947 |
| AU | 200020703 | 6/2000 | GB | 599793 | 3/1948 |
| BE | 417526 | 12/1936 | GB | 636423 | 4/1950 |
| BE | 557844 | 3/1960 | GB | 812671 | 4/1959 |
| BE | 1010339 | 6/1998 | GB | 1237744 | 6/1971 |
| BE | 1010487 | 10/1998 | GB | 1348272 | 3/1974 |
| CA | 991373 | 6/1976 | GB | 1430423 | 3/1976 |
| CA | 1169106 | 6/1984 | GB | 2117813 | 10/1983 |
| CA | 2226286 | 12/1997 | GB | 2126106 | 3/1984 |
| CA | 2252791 | 11/1998 | GB | 2256023 | 5/1991 |
| CA | 2289309 | 11/1999 | GB | 2243381 | 10/1991 |
| CH | 200949 | 1/1939 | GB | 2256023 | 11/1992 |
| CH | 211877 | 1/1941 | IT | 812671 | 4/1959 |
| DE | 1212275 | 3/1966 | JP | 5465528 | 5/1979 |
| DE | 7102476 | 6/1971 | JP | 57119056 | 7/1982 |
| DE | 2159042 | 11/1971 | JP | 3169967 | 7/1991 |
| DE | 2159042 | 6/1973 | JP | 4106264 | 4/1992 |
| DE | 2238660 | 2/1974 | JP | 4191001 | 7/1992 |
| DE | 7402354 | 5/1974 | JP | 5148984 | 6/1993 |
| DE | 2502992 | 7/1976 | JP | 6146553 | 5/1994 |
| DE | 2616077 | 10/1977 | JP | 656310 | 8/1994 |
| DE | 2917025 | 11/1980 | JP | 6320510 | 11/1994 |
| DE | 3041781 | 6/1982 | JP | 752103 | 2/1995 |
| DE | 3214207 | 11/1982 | JP | 407052103 A * | 2/1995 |
| DE | 8604004 | 4/1986 | JP | 7076923 | 3/1995 |
| DE | 3512204 | 10/1986 | JP | 7180333 | 7/1995 |
| DE | 3246376 | 2/1987 | JP | 7300979 | 11/1995 |
| DE | 3544845 | 6/1987 | JP | 7310426 | 11/1995 |
| DE | 3343601 | 12/1987 | NL | 7601773 | 2/1975 |
| DE | 3631390 | 12/1987 | NO | 157871 | 7/1984 |
| DE | 4002547-0 | 8/1991 | NO | 305614 | 5/1995 |
| DE | 4134452 | 4/1993 | PL | 26931 | 11/1974 |
| DE | 4215273 | 11/1993 | SE | 7114900-9 | 12/1974 |
| DE | 9317191 | 11/1993 | SE | 8206934-5 | 6/1987 |
| DE | 42 42 530 A1 | 8/1994 | SE | 501014 | 10/1994 |
| DE | 1534278 | 2/1996 | SE | 9301595-6 | 2/1995 |
| DE | 29710175 U1 | 8/1997 | SE | 502994 | 3/1996 |
| DE | 19651149 | 6/1998 | SE | 509059 | 11/1998 |
| DE | 19709641 | 9/1998 | SE | 509060 | 11/1998 |
| DE | 20001225 | 7/2000 | SE | 512290 | 2/2000 |
| DE | 19925248 | 12/2000 | SE | 512313 | 2/2000 |
| DE | 20018284 | 1/2001 | SU | 363795 | 11/1973 |
| DE | 20017461 | 2/2001 | WO | 8402155 | 6/1984 |
| DE | 20027461 | 3/2001 | WO | 8703839 | 7/1987 |
| | | | WO | 9217657 | 10/1992 |

| WO | 9313280 | 7/1993 |
| WO | 9401628 | 1/1994 |
| WO | 9426999 | 11/1994 |
| WO | 9623942 | 8/1996 |
| WO | WO 96/23942 * | 8/1996 |
| WO | 9627719 | 9/1996 |
| WO | 9627721 | 9/1996 |
| WO | 9630177 | 10/1996 |
| WO | 9747834 | 12/1997 |
| WO | 9824994 | 6/1998 |
| WO | 9824995 | 6/1998 |
| WO | 9858142 | 12/1998 |
| WO | WO 98/58142 * | 12/1998 |
| WO | 9940273 | 8/1999 |
| WO | 9966151 | 12/1999 |
| WO | 9966152 | 12/1999 |
| WO | 0006854 | 2/2000 |
| WO | 0056802 | 9/2000 |
| WO | 0063510 | 10/2000 |
| WO | 0066856 | 11/2000 |

OTHER PUBLICATIONS

Traindustrins Handbok "Snickeriarbete", Knut Larsson, Tekno's Handbocker Publikation Dec. 11, 1952.
Trabearbetning Anders Gronlund, TrateknikCentrum.
Bojlesystemet til Junckers boliggulve, Junckers Trae for Livet.
The Clip System for Junckers Sports Floors, Junckers Solid Hardood Flooring, Annex 7, p. ½.
The Clip System for Junckers Domestic Floors, Junckers Solid Hardwood Flooring, Annex 8, p. 1/4.
Focus, Information Till Alla Medabetare, Jan. 2001, Kahrs pa Domotex i Hannover, Tyskland, Jan. 13-16, 2001.
Opplaering OG Autorisasjon, Fibo-Trespo, ALLOC, Laminatgulvet som Legges Uten Lim.
CLIC, Art-Nr. 110 11 640.
Laminat-boden, Clever-Clickq.
Pergo, Clic Flooring, Laminatgolv.
Letter to the USPTO dated May 14, 2002, regarding U.S. Appl. No. 90/005,744.
Webster's Dictionary, p. 862, definition of "scarf".
Knights's American Mechanical Dictionary, vol. III, 1876, definition of "scarf".
Special Verdict, Civil Case No. 02-C-0736.
Fiboloc Literature, Mar. 1999.
Fiboloc Brochure, undated.

* cited by examiner

FLOORING PANEL OR WALL PANEL AND USE THEREOF

CROSS-REFERENCE TO RELATED APPLICATIONS

This application is a continuation of U.S. patent application 09/637,036, filed Aug. 10, 2000, now U.S. Pat. No. 6,397,547, which, in turn, is a continuation of U.S. patent application Ser. No. 08/894,966, filed Aug. 28, 1997, now U.S. Pat. No. 6,101,778, both incorporated herein in their entirety by reference, which, in turn, was a §371 national stage application of International Application Ser. No. PCT/SE96/00256, having an international filing date of 29 Feb. 1996, which, in turn, claims benefit of Swedish priority application 9500810-8, filed 7 Mar. 1995.

BACKGROUND OF THE INVENTION

1. Field of the Invention

The present invention relates to a flooring panel or wall panel and the use thereof in a wet room.

2. Description of the Prior Art

During the last few years laminated floors have achieved and increased popularity and on many markets they are beginning to replace parquet floors and wall-to-wall carpets. At the production of laminated floors a decorative thermosetting laminate is first produced. This laminate usually consists of a base layer of paper sheets impregnated with phenol-formaldehyde resin and a decorative surface layer consisting of a decor paper sheet impregnated with melamine-formaldehyde resin The laminate is produced by pressing the different layers at a high pressure and an increased temperature.

The laminate obtained is then glued to a carrier of particle board for instance or used as such without any carrier and it is then called compact laminate The laminated panel thus produced is then sawn up to a number of floor boards which are provided with groove and tongue at the long sides and the short sides. Often the floor boards produced have a thickness of about 7 mm, a length of 120 cm and a width of about 20 cm. Thereby they can usually be put on top of an existing flooring material at a renovation. According to another alternative, instead one or more of the above decorative sheets can be laminated directly towards a base sheet of particle board for instance.

At the assemblage of such a flooring glue is normally applied in the groove when the floor boards are assembled. Therefore, it will be difficult to change a damaged board or to remove a whole flooring and for instance install it in another room.

To avoid the above problem efforts have been made to achieve floor boards which can be assembled without glue. One such construction is disclosed in the U.S. Pat. No. 5,295,341 There the boards are provided with groove and tongue in the usual way, but here a snap-together system is included in the groove-tongue joint.

These floor boards can be assembled without glue However, they have the disadvantage that the joints between the boards will be flexible and not rigid This means that if the surface below the floor boards is not completely even which is usually the case, a gap will be formed between the boards In these gaps dirt and water can penetrate

SUMMARY OF THE INVENTION

According to the present invention also the last mentioned problem has been solved and a flooring panel or wall panel, preferably of thermosetting laminate having two pairs of parallel side edges has been brought about. Two of these side edges are provided with a locking means in the form of a groove and the other two with a tongue fitting in the groove whereby a tongue/groove joint for assembling of the panels is formed. The groove and the tongue are made of a water tight material and formed with a snap-together joint including one or more snapping webs or the like with corresponding cooperating snapping grooves. The groove in front of the snap-together joint has an entrance opening and continues inside the snap-together joint in a stabilizing groove. The tongue is formed with a rear neck intended to fit in the entrance opening and a forwardly protruding stabilizing part situated in front of the snap-together joint and intended for a tight fit in the stabilizing groove, whereby connecting panels when assembled by the snap-together joints and the stabilizing parts in the stabilizing grooves are fixed to each other and prevented from unintentional separation while at the same time a rigid floor covering or wall covering respectively with water tight joints and without unintentional gaps between the panels is obtained.

DESCRIPTION OF THE PREFERRED EMBODIMENTS

Figure 1:
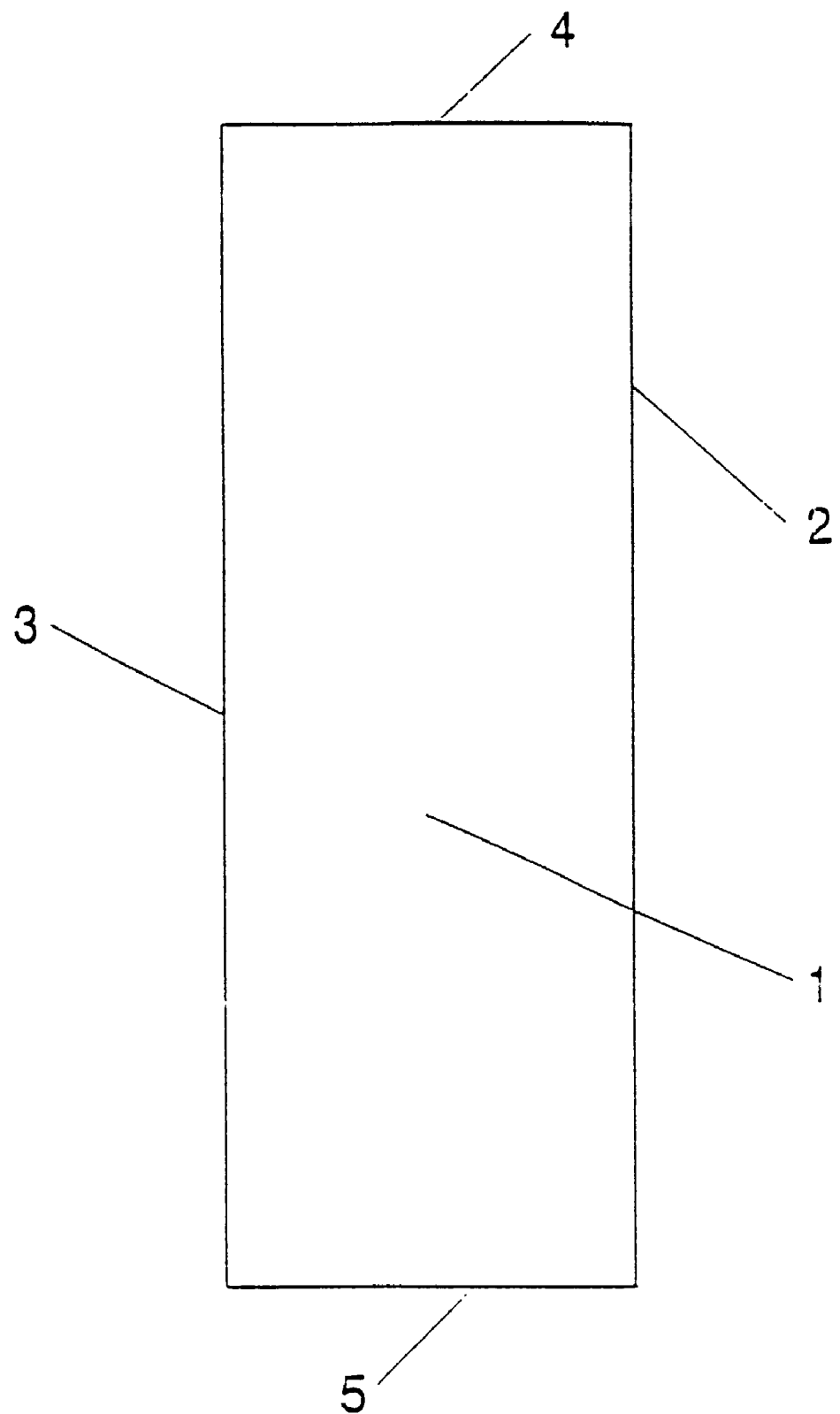
FIG. 1 schematically shows a panel according to the invention seen from above.

According to one preferred embodiment two adjacent side edges of the panel are provided with a groove and the other two side edges with a tongue. At this embodiment the panel is usually rectangular, but it can also be square.

At square panels it is also possible to provide a pair of parallel sides with a groove and the other pair with a tongue However, the choice of pattern on the surface layer of the panel is limited at this shape.

It is preferred that the groove and the tongue are made of thermoplastic, a thermosetting laminate, aluminum or a chipboard or particle board impregnated with a thermoplastic. Of course also other water tight materials can be used.

At one embodiment, the groove as well as the tongue are formed as a ledge fixed to the side edges of the panel Suitably the ledge-formed groove and tongue respectively are then fixed in a recess along the side edges with glue for instance.

The snapping webs can be formed on the upper and/or lower side of the tongue while fitting snapping grooves are formed in the groove.

In one preferred embodiment one snapping web is formed on the upper side of the tongue and one on the lower side thereof while the groove has two fitting snapping grooves one at the top and one at the bottom.

If necessary one pair of snapping webs can be formed on the upper side of the tongue and one pair on the lower side thereof. Of course you then need two snapping grooves at the top and two snapping grooves at the bottom of the groove to fit with the snapping webs. This construction will give an extremely strong joint.

Of course the snapping webs can instead be arranged in the groove and the snapping grooves on the tongue.

In one preferred embodiment the width of the stabilizing part is 2-10 mm, preferably 4-10 mm. Generally a wider stabilizing part with fitting stabilizing groove gives a better rigidity of the assembled panels.

The stabilizing part will also assist in a correct assemblage of the panels. Thus, when the stabilizing part moves into the stabilizing groove you get a correct level of the panels and the panels can easily be pushed into the correct position where you do not have any gap between the panels Of course without any substantial gap between the panels water and dirt are prevented from entering the assembled flooring or wall covering.

As a safe guard against water penetration a seal might be arranged in the inner part of the stabilizing groove for instance.

Preferably the grooves and the tongues run the full length of the side edges of the panels.

The panels can be designed in such a manner that the under side of the groove and the tongue are situated in the same level as the under side of the panel The panels can be used for covering floors and walls in ordinary dry rooms However, due to the rigid and water tight joints the panels can be used also for wet rooms For such applications the whole panel is preferably made of thermosetting laminate of so-called compact laminate type. Such a laminate does not absorb water.

Another alternative is a non water absorbing base with a water tight surface The surface may for instance consist of paint, a thermoplastic foil such as polyethylene, polypropylene or polyvinyl chloride, a paper sheet impregnated with thermosetting resin or of a thermosetting laminate.

One suitable non water absorbing base is a board produced by pressing wood particles or wood chips impregnated with a thermoplastic.

Figure 2:
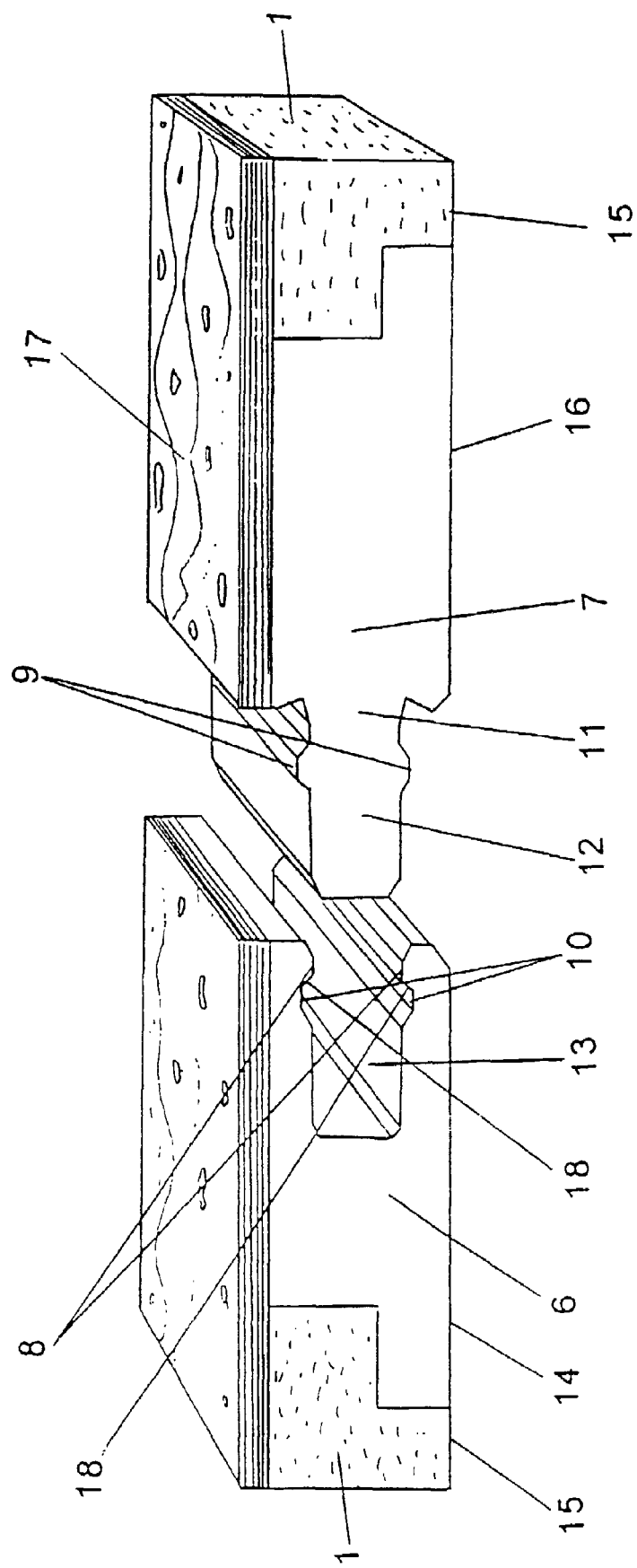
FIG. 2 shows a cross section through two adjacent edges of two panels according to the invention wherein the two such panels are to be assembled.
Figure 3:
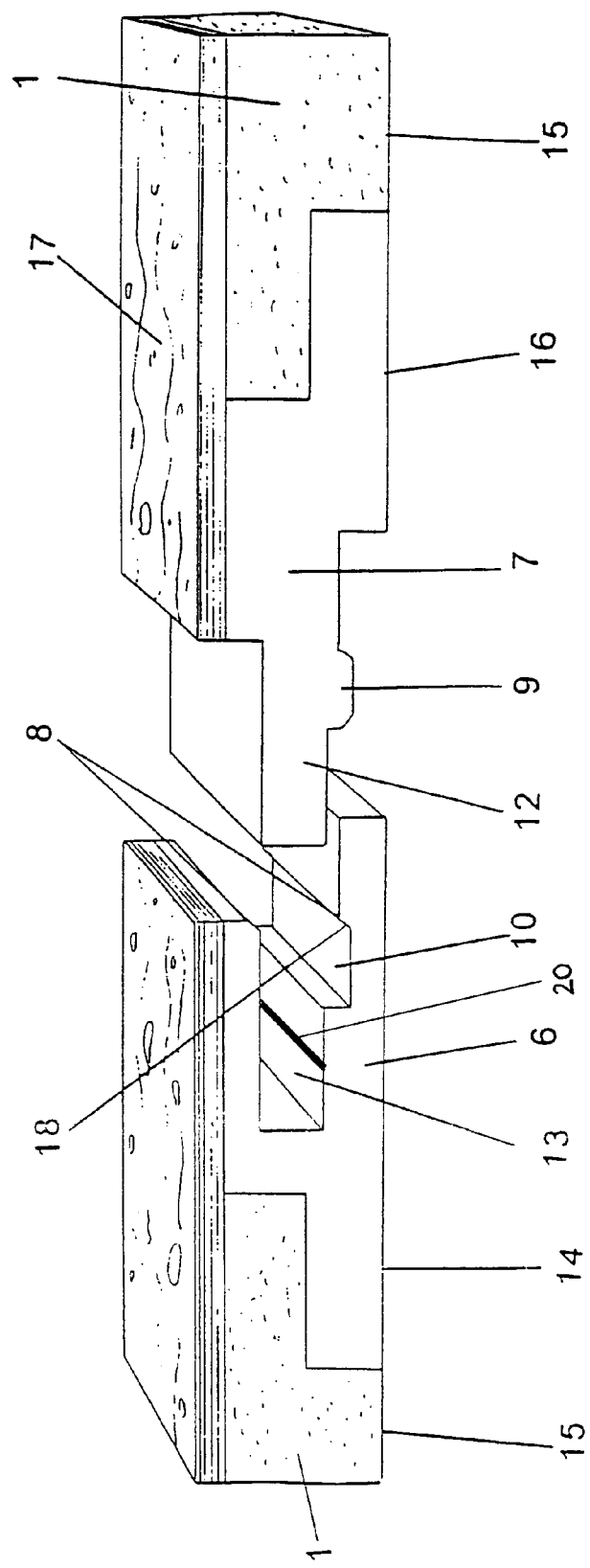
FIG. 3 shows a cross section through two adjacent edges of a second embodiment of a panel where two such panels are to be assembled.

The invention will be further explained in connection with the enclosed figures of which FIG. 1 schematically shows a panel 1 according to the invention seen from above The panel is drawn with a rectangular shape but it can as well be square FIGS. 2 and 3 show a cross section through two adjacent edges of two embodiments of a panel where two such panels are to be assembled. The construction according to FIG. 2 is preferred.

The panel 1 consists of a base of wood particles impregnated with a thermoplastic with a decorative thermosetting laminate as a surface layer 17 glued on top.

The panel 1 has two pairs of parallel side edges 2, 3 and 4, 5 respectively (FIG. 1). Two of these side edges are provided with locking means in the form of a groove 6 and the other two with a tongue 7 fitting in the groove 6, whereby a tongue/groove joint for assembling of the panels is formed.

The groove 6 and the tongue 7 are made of a water tight material and formed with a snap-together joint. In the embodiment shown in FIG. 2 the snap-together joint consists of two snapping webs 9, one on the upper side of the tongue 7 and one on the lower side of tongue, these webs 9 cooperating with two fitting snapping grooves 10.

In front of the snap-together joint, which means the snapping webs 9 and the snapping groove 10, the groove 6 has an entrance opening 8. Inside the snap-together joint the groove 6 continues in a stabilizing groove 13.

The tongue 7 is formed with a rear neck 11 intended to fit in the entrance opening 8 of the groove 6. In front of the snap-together Joint the tongue 7 has a forwardly protruding stabilizing part 12 intended for a tight fit in the stabilizing groove 13.

The parts 9 and 10 included in the snap-together joint are also adapted to each other to give a tight fit and strong joint To increase this effect further the snapping grooves 10 are provided with undercut edges 18 which cooperate with the backside of the snapping webs 9 with the same undercut.

The groove 6 and the tongue 7 are made of thermosetting laminate and formed as a ledge fixed by glue in a recess along the side edges of the panel. The under side 14 of the groove 6 is situated in the same level as the under side 15 of the panel and the under side 16 of the tongue 7 is situated in the same level as the under side 15 of the panel 1.

When connecting panels have been assembled by the snap-together joints and the stabilizing parts 12 inserted in the stabilizing grooves 13, the panels are fixed to each other and prevented from unintentional separation A rigid floor covering or wall covering with water tight joints and without unintentional gaps between the panels is obtained The usual rotation of the snapping webs 9 in the snapping grooves 10 is prevented by the stabilizing parts 12 in the stabilizing grooves 13 Accordingly these parts are essential for the possibility to get a rigid joint between the panels.

The embodiment shown in FIG. 3 is very similar to that according to FIG. 2. The difference is that only the under side of the tongue 7 is provided with a snapping web 9. The upper side is lacking a snapping web. Accordingly there is only one snapping grove 10 at the bottom of the groove 6.

FIG. 3 additionally shows a seal 20 as a safe guard against water penetration, positioned, for example, in the inner part of the stabilizing groove 13.

The invention is not limited to the embodiments shown since these can be modified in different ways within the scope of the invention.

I claim:

1. A flooring panel said flooring panel comprising a decorative upper surface, said flooring panel being defined by edges, at least one of said edges having at least one of a tongue or groove;

said at least one of said tongue or said groove on said panel being sized and shaped so as to engage a corresponding groove or tongue on another similar panel;

at least one of said tongue and groove being provided with a snapping web shaped so as to interfit with a snapping groove on another panel, wherein said snapping groove and said snapping web comprise the same material as said tongue and groove, whereby said panel can be assembled to said another panel in the absence of glue to form a tight joint;

said tongue and groove being formed of the same material as the remainder of the panel and being unitary with the remainder of the panel, wherein at least the tongue is formed of particles of wood impregnated with a plastic.

2. A flooring panel said flooring panel comprising a decorative upper surface, said flooring panel being defined by edges, at least one of said edges having at least one of a tongue or groove;

said at least one of said tongue or said groove on said panel being sized and shaped so as to engage a corresponding groove or tongue on another similar panel;

at least one of said tongue and groove being provided with a snapping web shaped so as to interfit with a snapping groove on another panel, wherein said snapping groove and said snapping web comprise the same material as said tongue and groove, whereby said panel can be assembled to said another panel in the absence of glue to form a tight joint;

said tongue and groove being formed of the same material as the remainder of the panel and being unitary with the remainder of the panel, wherein at least the portion of the panel defining said groove is formed of particles of wood impregnated with a plastic.

3. A flooring panel
said flooring panel comprising a decorative upper surface,
said flooring panel being defined by edges, at least one of said edges having at least one of a tongue or groove;
said at least one of said tongue or said groove on said panel being sized and shaped so as to engage a corresponding groove or tongue on another similar panel;
at least one of said tongue and groove being provided with a snapping web shaped so as to interfit with a snapping groove on another panel, wherein said snapping groove and said snapping web comprise the same material as said tongue and groove, whereby said panel can be assembled to said another panel in the absence of glue to form a tight joint;
said tongue and groove being formed of the same material as the remainder of the panel and being unitary with the remainder of the panel, wherein a plurality of paper sheets are attached to a carrier, wherein the carrier is a non-water absorbing base.

* * * * *